Patented Apr. 1, 1930

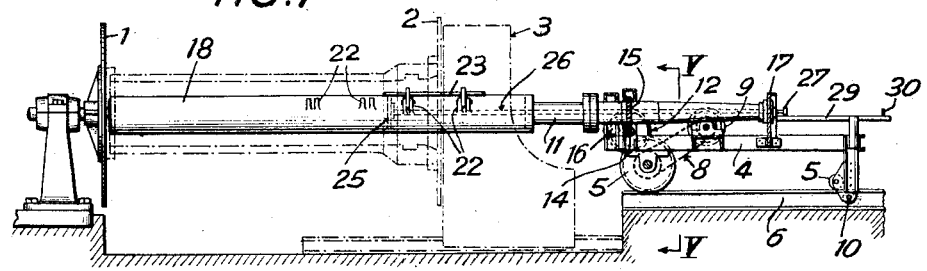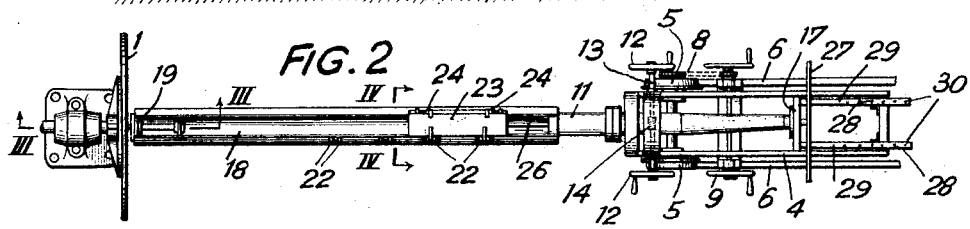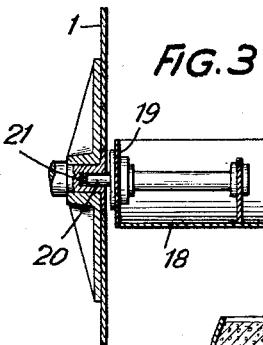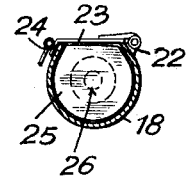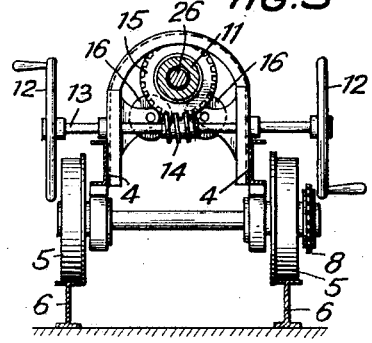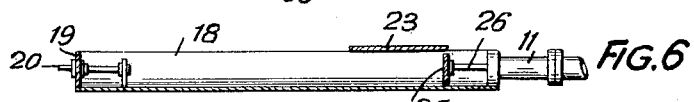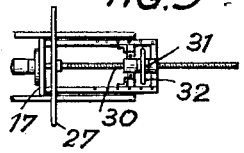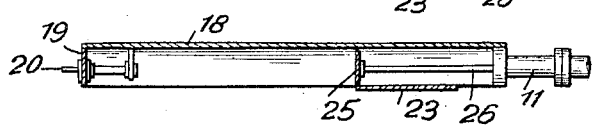

1,752,626

UNITED STATES PATENT OFFICE

PAUL ZEHNDER, OF LUCERNE, SWITZERLAND, ASSIGNOR TO THE FIRM INTERNATIONALE SIEGWARTBALKENGESELLSCHAFT IN LUZERN, OF LUCERNE, SWITZERLAND

DEVICE FOR THE PRODUCTION OF TUBES, POLES, AND THE LIKE FROM REENFORCED CONCRETE CENTRIFUGALLY

Application filed March 27, 1929, Serial No. 350,255, and in Switzerland January 24, 1929.

In the devices heretofore known for the production of oblong tubular articles such as tubes, poles and the like from re-enforced concrete by centrifugal action, the material charging device was provided with a gun-shaped feed member which either was formed in the manner of a tiltable trough-like container or of a trough with a slot in its bottom and a shutter for closing the latter. The trough is uniformly filled with material, inserted into the mould and tilted or the shutter is opened respectively, whereby the material is discharged into the mould and is formed in a tube of uniform wall thickness by the force of centrifugal action inherent to the speed imparted to the mould. The additional amount of material required for the production of thickened portions of the tubes i. e. of sockets was provided by shoveling the said material into the mould by hand. The filling of the mould by hand is uneconomical and unreliable.

The invention has for its object to eliminate these disadvantages, in that the material charging apparatus according to the invention is provided with a wheeled tiltable, charging member shaped in the manner of an oblong, trough-like container open on top to receive the material for the production of a uniform wall thickness of the tube and the additional material for thickened portions in said wall, and further provided with means to discharge the additional material in a predetermined part of the receiver and thereby in a predetermined part of the mould.

In the accompanying drawing an embodiment of the invention is illustrated, by way of example, in which:

Fig. 1 is an elevation of a feed apparatus,

Fig. 2 a plan view of Fig. 1, and

Fig. 3 a section on a larger scale on the line III—III in Fig. 2;

Fig. 4 is a section on a larger scale on the line IV—IV in Fig. 2, and

Fig. 5 a section on a larger scale on the line V—V in Fig. 1;

Figs. 6, 7 and 8 show schematically different positions of the feed barrel during the filling operation.

Fig. 9 is a detail variation and

Fig. 10 shows a filler inserted in the container.

For the sake of a better understanding of the following explanations the most important parts of a device for the production of oblong tubular articles of re-enforced concrete according to the U. S. patent specification No. 1,521,264 dated December 12th, 1924, are partly shown in full and partly indicated in chain dotted lines on the accompanying drawing. Therein, 1 denotes the chuck plate of the fixed head-stock and 2 the chuck plate of the traveling tail-stock 3, between which plates the mould is mounted. In the rear of the tail-stock 3 a wheeled material charging barrel is arranged. 4 is the carriage of the latter supported by rollers 5 adapted to run on rails 6. The barrel is enabled to be inserted through the hollow chuck plate 3 so far into a mould mounted between the chuck plates that its closed forward end 19 approaches the chuck plate 1. The carriage is adapted to be moved to and fro by means of a crank handle 9 and a chain drive 8. On the rearward end of the carriage two rollers 10 are provided which, grip under the rails 6, in order to prevent the loaded barrel from tilting forwards.

The hollow rear part 11 of the barrel 4 is turnably mounted in the carriage 4. On the front part of the carriage a worm 14 is fixed to a transversely disposed shaft 13 provided with hand wheels 12; the worm 14 is in mesh with a toothed rim 15 on the part 11 of the barrel. The part 11 of the barrel is mounted in front on two rollers 16 and in the rear it is journalled in a closed bearing 17. The front part of the barrel 18 projecting from the carriage is formed in the manner of a trough-like container and carries on its front face 19 a pin 20, fitting in a corresponding bore 21 in the chuck plate 1, for the purpose of centering and supporting the container 17. Adjacent to the one edge of the trough-like container 18 lateral hinge bearings 22 are provided for pivotally connecting the cover 23. Adjacent to the opposite edge of the container means 24 are arranged to lock the cover in its closed position. A piston 25 the rod 26 of which is guided in the bore of the barrel part 11 is longitudinally displaceable in the container 18. The piston rod 26 carries on its rear end a transverse bar 27 which is adapted to abut against pins 30 insertable in holes 28 of two guide bars 29. The holes 28 enable to arrest the piston in predetermined positions relatively to the container 18.

The manner of applying the described apparatus for charging a device for the production for example of tubes from re-enforced concrete is as follows:

Assuming that the mould is mounted between the chuck plates, the charging barrel is then uniformly filled with material up to the piston while the container takes up a position retracted from the mould and its cover is open. Thereby, the position of the cover 23 is determined corresponding to the length of the tube to be produced, i. e. by the position of the part of the tube which is to be supplied with additional material, for example an end-socket. The additional amount of material is determined by the position of the piston 25 in the container 18. This amount is defined by the cross section of the respective tube and is determined by the position of the stop pins 30. After the container 18 has been filled and the cover 23 closed (Fig. 6) the carriage is moved by means of the crank handle 9, whereby the barrel is inserted into the mould until the pin 20 engages the bore 21 of the chuck plate 1. During the slow rotation of the mould, the container 18 is gradually tilted by means of the hand wheels 12 on the worm drive 14, 15 (Fig. 7). Thereby the material is discharged to form a uniform layer in the mould. Now the piston 25 is slowly advanced (Fig. 8) while the rotation of the mould is continued, so that the material retained by the cover now enters the mould in the part of the tube which has been predetermined by the position of the cover. When the barrel was filled the piston 25 had been further retracted than required for the length of the tube to be produced (compare the Figs. 1 and 6). Consequently, the last part of the tube is supplied with more material than the other parts thereof. While the container is tilted the cover prevents any material from being deposited outside the mould i. e. in the chuck plate 3.

The piston may be actuated by hand or by any mechanical means. In Fig. 9 the piston rod 26 is shown to be provided with screw thread 30 with which a stationary nut 31 forming the boss of a hand wheel 32 cooperates. By turning the hand wheel 32 the piston is axially displaced. The exact amount of additional material required for instance for a socket can be determined, independent of the labourer, by adjusting the piston by means of the set pins 30. If it is desired to produce tubes of various lengths, the cover is brought in engagement with different hinge bearings on the barrel, so that the outer end of the cover, with the barrel inserted in the mould, again corresponds to the location of the socket.

If tubes of different wall thicknesses or diameters respectively are to be made the amount of material for the portion of the tube with uniform wall thickness also varies, consequently one and the same barrel will have to be filled more or less with material. Now, in order to be independent of hand labor for the control of the extent to which the barrel has to be filled, it is desirable to provide filler blocks 33 for the container (in Fig. 10,) for instance of wood, which are laid on the bottom of the same and held in place due to its curvature or otherwise and having a length equal to that of the uniform wall thickness of a tube so that it does not interfere with the piston 25. This manner enables a complete filling flush with the top edge of the container for any wall thickness or diameter of tubes, the less amount of material required for smaller wall thicknesses or diameters respectively being equalized by the insertion of corresponding filler blocks.

I claim:

1. A material charging apparatus for moulds of devices for the production of tubes, poles and the like from re-enforced concrete centrifugally, comprising in combination, a mobile, tiltable charging member shaped in the manner of an oblong, trough-like container open on top for the reception of the material for producing the wall of uniform thickness of a tube and the additional amount of material for thickened portions of the tube, and means for discharging the additional material in a certain part of the apparatus and consequently in a certain part of the mould.

2. A material charging apparatus for moulds of devices for the production of tubes, poles and the like from re-enforced concrete centrifugally, comprising in combination, a mobile, tiltable charging member shaped in the manner of an oblong, trough-like container open on top for the reception of the material for producing the wall of uniform thickness of a tube and the additional amount of material for thickened portions of the tube, a piston longitudinally displaceable in said container for ejecting the additional material and a cover adapted to be locked in order to prevent the release of the material during the tilting of the trough-like container.

3. A material charging apparatus for moulds of devices for the production of tubes, poles and the like from re-enforced concrete centrifugally, comprising in combination, a mobile, tiltable charging member shaped in the manner of an oblong, trough-like container open on top for the reception of the material for producing the wall of uniform thickness of a tube and the additional amount of material for thickened portions of the tube, a piston longitudinally displaceable in said container for ejecting the additional material, a piston rod rigidly connected to said piston, adjustable set pins adapted to cooperate with said piston rod for the purpose of defining the amount of additional material by adjusting the piston in the container prior to the filling of the latter, and a cover adapted to be locked in order to prevent the release of the material during the tilting of the trough-like container.

4. A material charging apparatus for moulds of devices for the production of tubes, poles and the like from re-enforced concrete centrifugally, comprising in combination, a mobile, tiltable charging member shaped in the manner of an oblong, trough-like container open on top for the reception of the material for producing the wall of uniform thickness of a tube and the additional amount of material for thickened portions of the tube, a piston longitudinally displaceable in said container for ejecting the additional material, a cover adapted to be locked in order to prevent the release of the material during the tilting of the trough-like container, hinge members provided on the container for pivotally supporting the cover, and additional hinge members on the container enabling the cover to be pivotally supported in different positions thereof corresponding to the lengths of the tubes to be produced.

5. A material charging apparatus for moulds of devices for the production of tubes, poles and the like from re-enforced concrete centrifugally, comprising in combination, a mobile, tiltable charging member shaped in the manner of an oblong, trough-like container open on top for the reception of the material for producing the wall of uniform thickness of a tube and the additional amount of material for thickened portions of the tube, means for discharging the additional material in a certain part of the apparatus and consequently in a certain part of the mould, and exchangeable filler blocks insertable into the container, enabling the amount of material contained therein to be adapted to a certain wall thickness or a certain diameter respectively of a tube to be produced, while the container is always filled up to the same point.

In testimony whereof I have signed my name to this specification.

PAUL ZEHNDER.